United States Patent Office  3,302,112
Patented Jan. 31, 1967

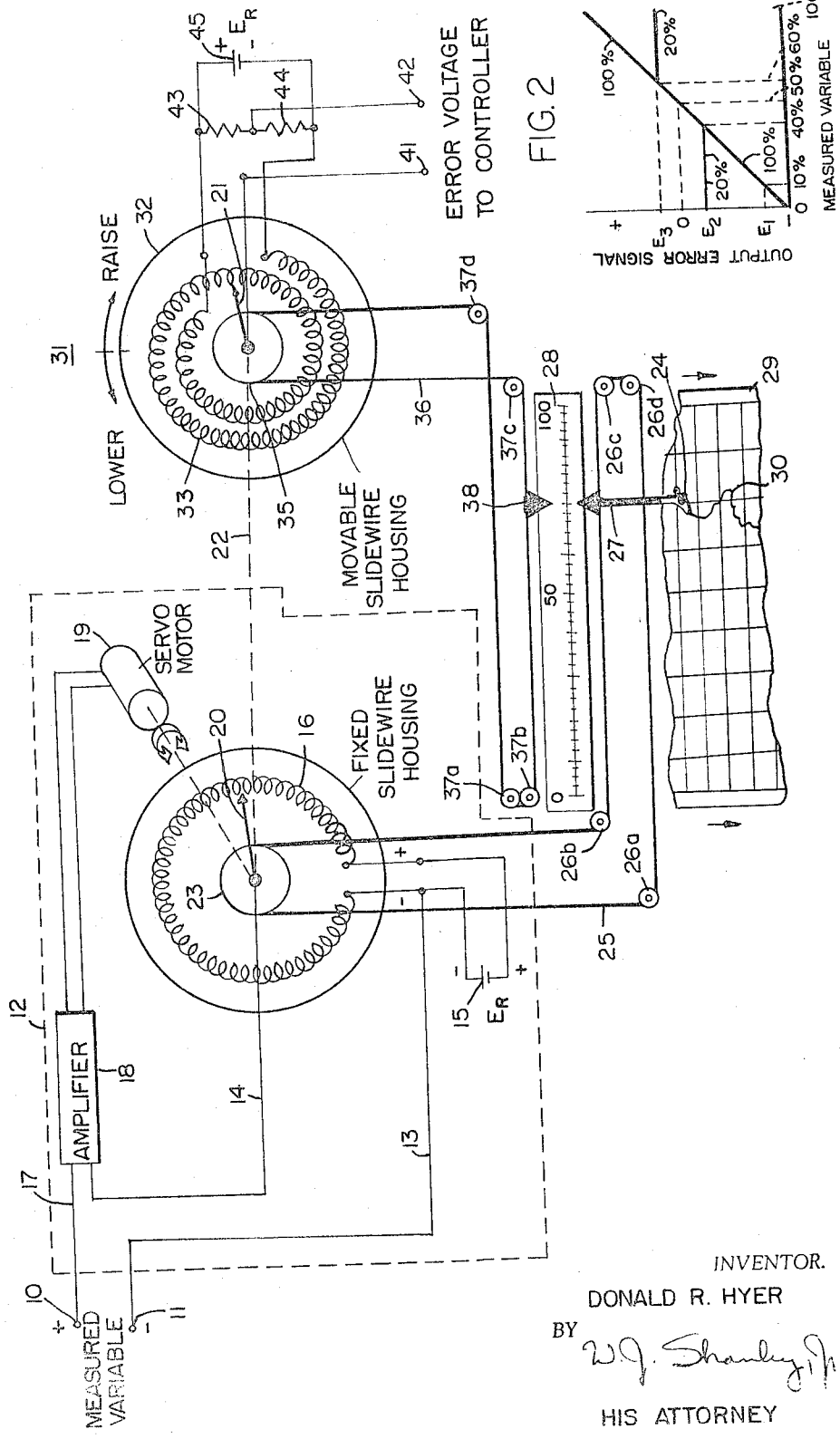

3,302,112
ELECTROMECHANICAL RECORDER CONTROL SLIDEWIRE PROVIDING ERROR SIGNALS PROPORTIONAL TO DEVIATION OF MEASURED VARIABLE FROM SET POINT OVER ENTIRE RECORDER SCALE
Donald R. Hyer, Lynn, Mass., assignor to General Electric Company, a corporation of New York
Filed Sept. 16, 1963, Ser. No. 309,247
1 Claim. (Cl. 324—99)

This invention is directed to electromechanical recorders, and more particularly to electromechanical recorders of the type utilizing control slidewires for developing error signals which are useful in driving control devices.

Heretofore, such recorders have commonly utilized control slidewires which are effective only when the measured variable is within predetermined limits either side of the set point. Such slidewires, which generally are of the type known as 20% slidewires, have become quite common since by so limiting their physical length the ambiguity problem associated with the longer slidewires of the prior art is obviated. Ambiguity occurs with such slidewires when the slider is rotated far enough to go off one end of the slidewire and come into contact with the other end of the slidewire. This causes an erroneous reversal in the polarity of the error signal.

In accordance with a common prior art technique, the physical length of the 20% slidewire is limited by insulating the slider from the control slidewire whenever the measured variable signal is outside of a range of ±10% of the set point. Provisions are also made to connect the proper polarity signal to the slider when outside of such range in order to identify whether the measured variable is above or below the set point. The difficulty with such a system is that the only information which can be obtained from such a control slidewire is that which occurs when the measured variable is within the range of ±10% of the set point. Thus, there is no way of determining from the resulting signal, when the measured variable is outside this range, the magnitude of the measured variable, the rate at which it might be changing, or the direction in which it is changing.

Limited range control slidewires, such as 20% control, are acceptable in some types of applications. However, in other types of applications it is highly desirable to be able to provide an error signal which is proportional to the difference between the measured variable and the set point throughout the range of the recorder. This type of control slidewire will hereinafter be referred to as a 100% control slidewire meaning that it will be provide, in cooperation with associated elements necessary to form a bridge circuit, a proportional error signal throughout the entire range of the measured variable signal. Slidewires capable of 100% control are found to be highly desirable in applications in which the recorder is utilized with a controller capable of automatically controlling the startup of a process with little or no overshoot attributable to reset windup in the controller.

It is therefore an object of this invention to provide an electromechanical recorder which is capable of generating an error signal which will be proportional to the deviation of the measured variable from the set point over the entire recorder scale.

It is another object of this invention to provide an electromechanical recorder having a 100% control slidewire which provides unambiguous control signals without utilizing switching devices.

The uses of 100% control slidewires is not limited to those applications in which they are utilized to drive controllers which are automatically controlling the startup of a process, but they are also useful in driving low gain control devices so that they will be able to operate the controlled device over its entire range. For example, when driving a control device adjusted for unity gain with the set point at 50%, it is necessary to generate a ±50% error signal, not just a ±10% signal, to be able to operate the controlled device over its entire range. Thus, if the controlled device is a valve, a ±50% error signal would be necessary to operate it between its "full on" and "full off" positions. This can only be accomplished with a 100% control slidewire.

Recorders having 100% control slidewires are also necessary for driving control devices or controllers having rate action when controlling processes subject to large deviations of the measured variable since 20% slidewires can only give rate information when the measured variable is within ±10% of the set point.

In accordance with the invention, an electromechanical recorder having a slidewire capable of 100% control is provided by providing a control slidewire having a length equal to the sum of the range of travel of the slider of the measurement slidewire plus the range of travel of the slidewire of the control slidewire assembly. This assures that the slider of the control slidewire assembly will always remain in cooperative engaging relationship with the control slidewire throughout the entire range of the recorder.

Other objects and features of my invention will be apparent from the following description taken in connection with the accompanying drawings in which:

FIG. 1 is a schematic representation of the preferred embodiment of my invention, and FIG. 2 is a plot of measured variable versus output error signal which is useable in explaining the advantages of the 100% slidewire of the invention.

Referring now to FIG. 1, the measured variable voltage appearing across terminals 10 and 11 is measured by potentiometric measuring circuit 12 and compared to the positioning of control slidewire 31, which is representative of the set point, to provide the required error signal. The signal applied across terminals 10 and 11 normally will vary within a certain range of values, for example, from 0.2 to 1 volt. This range of input signals will correspond with an output range of the recorder from zero to full scale.

Means is provided by conductors 13 and 14 for comparing the measured variable signal with a known voltage generated by reference voltage source 15 which is applied across measuring slidewire 16. This difference or error signal which appears between conductors 14 and 17 is applied to the input of amplifier 18 where it is converted from D.-C. to A.-C. by means of a chopper, the output signal of which is amplified and used to drive servo motor 19 until the error signal is nulled out. This null condition arises when slider 20 is so positioned that the voltage appearing across conductors 13 and 14 is equal and opposite to the measured variable appearing across terminals 10 and 11. Thus, the position of slider 20 will be representative of the magnitude of the measured variable voltage appearing across terminals 10 and 11.

Cable sheave 23, which is supported to rotate with slider 20 on shaft 22, drives recording pen 24 through the cable and pulley assembly which comprises cable 25 and pulleys 26a–26d. Pointer 27 is supported by the cable and pulley assembly to be moved in unison with recording pen 24 and in cooperative relationship with scale 28 so as to indicate at all times the magnitude of the measured variable.

The details of the strip chart carriage assembly of the recorder have not been illustrated since they form no part of this invention. It suffices here to say that the carriage assembly serves to advance strip chart 29 in contact with recorder pen 24 so that the position of the recording pen with respect to time indicated by trace 30 is recorded upon strip chart 29.

Control slidewire assembly 31 is comprised of rotatable control slidewire 33 which is carried by housing 32 and control slider 21 which is positioned in accordance with the position of shaft 22. The manual rotation of slidewire 33, which may be accomplished by manually rotating housing 32, permits the setting of the set point to any point on scale 28. Of course, housing 32 may also be automatically rotatable to facilitate the adjustment of the set point by means of a computer or other device. Cable sheave 35, which is secured to rotate with housing 32, cooperates with cable 36 and pulleys 37a–d to position pointer 38 on scale 28 in accordance with the position of control slidewire 33. Housing 32 is rotatable throughout a range of travel which permits pointer 38 to be positioned at any point on scale 28 between zero and 100.

Cable 36 is positioned with respect to cable sheave 35 so that slider 21 is in the center of slidewire 33 when pointer 38 is aligned with pointer 27. When so calibrated, pointer 38 will directly indicate the set point upon scale 28. Thereafter, whenever slider 21 is positioned at the center of slidewire 33, a zero error voltage will appear across terminals 41 and 42 since slidewire 33 forms a bridge circuit in cooperation with resistors 43 and 44 which are of equal value and reference voltage source 45. Thus, it may be seen that a zero error voltage will appear across output terminals 41 and 42 when the measured variable across terminal 10 and 11 is equal to the set point indicated by pointer 38.

In accordance with the illustrated preferred embodiment of my invention, slidewire 16 of the measuring slidewire assembly has an effective angular length of 320 degrees. Slider 20 has a corresponding angular range of travel which provides a range of travel sufficient to move pointer 27 from zero to 100 on scale 28. Slidewire housing 32 and, consequently, control slidewire 33 are rotatable through 320 degrees which corresponds to the movement of pointer 38 from zero to 100 upon scale 28. It is an important feature of this invention that control slidewire 33 have an angular length which is equal to the sum of the limit of angular rotation of slider 20 plus its own limit of angular rotation. This results in the control slidewire 33 having an angular length of 640° when the slider 20 and slidewire 33 have the indicated ranges of travel.

Provisions, well known in the art, are made so that slider 21 will remain in cooperative engaging relationship with slidewire 33 throughout 640° of relative motion by forming slidewire 33 as a helix on an inner peripheral of housing 32. In this way, an output error voltage, which is proportional to the difference between the measured variable voltage and the set point, will be provided throughout the entire range of the recorder.

Referring now to FIG. 2, in accordance with the preferred embodiment of my invention, if the set point were set, for example, at 50%, the resulting output error signal would be proportional to the measured variable up to ±50% from the set point; i.e., over the entire range of the measured variable. For example, if the measured variable were equal to 10, an error voltage of $-E_1$ would be provided across output terminals 41 and 42. This voltage would be proportional to the difference between the set point (50) and the measured variable (10). This is to be contrasted with the error voltage $-E_2$ developed by a 20% slidewire. This voltage is not proportional to the measured variable except when the measured variable is 40%. This is readily apparent when the curve of the prior art 20% slidewire is considered since the error voltage $-E_2$ is constant when the measured variable lies at any point between zero and 40.

The 20% slidewire will, in like manner, provide a constant error voltage $+E_3$ when the measured variable falls at any point between 60 and 100 on scale 28. Thus, it may be seen that in these two ranges the 20% slidewire cannot provide the required proportional or rate information. This is to be contrasted with the 100% slidewire of my invention which provides the requisite information throughout the entire range of the recorder.

While there has been described what is at present considered to be the preferred embodiment of my invention, it will be apparent to those skilled in the art that various changes and modifications may be made therein without departing from the spirit or scope of the invention.

What I claim as new and desire to secure by Letters Patent of the United States is:

A recorder for generating an electrical error signal proportional to the difference between a measured variable signal and a desired set point signal comprising:

(a) a first slidewire device including a first stationary slidewire and a first slider, (b) servometric means responsive to the measured variable signal to position said first slider, the angular position of said slider with respect to said first slidewire indicating the measured variable signal, (c) means connected to said first slider to provide an indication of said measured variable, (d) a second slidewire device having a second slidewire and a second slider, said second slider being directly connected to said first slider and rotatable through a first angle representing the range of said measured variable signals, (e) rotatable set point input means directly supporting said second slidewire for rotation therewith, said second slidewire being helically disposed on said support means in a plurality of turns, said input means being rotatable through a second angle indicating the range of the set point signals, the total length of said second slidewire defining a third angle equal to the sum of said first and second angles, said second slider being rotatably mounted on said support means for rotation with respect to said second slidewire, (f) means connected to said rotatable support means to provide an indication of the set point signal, and (g) bridge circuit means including said second slidewire and said second slider energized by a reference voltage input means across one set of opposite terminals, the error voltage being generated across the other set of opposite terminals.

References Cited by the Examiner

UNITED STATES PATENTS 2,150,006 3/1939 Parker _____ 324—99 X
3,176,205 3/1965 Peters _____ 318—28

WALTER L. CARLSON, *Primary Examiner.*

J. J. MULROONEY, *Assistant Examiner.*